(12) United States Patent
Leonidov et al.

(10) Patent No.: US 6,650,712 B1
(45) Date of Patent: Nov. 18, 2003

(54) LOW COMPLEXITY METHOD AND APPARATUS FOR FSK SIGNAL RECEPTION

(75) Inventors: Alexandre Leonidov, Buffalo Grove, IL (US); Vitali Vinokour, Brookline, MA (US); Benjamin Dolnik, Buffalo Grove, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/361,699

(22) Filed: Jul. 27, 1999

(51) Int. Cl.[7] .......................... H04L 27/14; H04L 27/10

(52) U.S. Cl. ...................................... 375/334; 375/272

(58) Field of Search ................................. 375/334, 295, 375/260, 341; 370/419, 497

(56) References Cited

U.S. PATENT DOCUMENTS

| | | | | |
|---|---|---|---|---|
| 4,290,140 A | * | 9/1981 | Malm | 375/273 |
| 4,485,448 A | * | 11/1984 | Kurth | 702/70 |
| 4,716,376 A | * | 12/1987 | Daudelin | 329/300 |
| 5,077,755 A | * | 12/1991 | Kaku et al. | 375/232 |
| 5,625,652 A | * | 4/1997 | Petranovich | 375/355 |
| 5,764,708 A | * | 6/1998 | Glass | 375/340 |
| 6,151,335 A | * | 11/2000 | Ko et al. | 370/487 |
| 6,297,691 B1 | * | 10/2001 | Anderson et al. | 329/300 |

OTHER PUBLICATIONS

"Data Communication Over the Telephone Network: 300 Bits Per Second Duplex Standardized for Use in the General Switched Telephone Network", Recommendation V.21, International Telecommunication Union, 1988, 1993, pp. 1 to 7.

"Data Communication Over the Telephone Network: 600/1200–Baud Modem Standardized for Use in the General Switched Telephone Network", Recommendation V.23, International Telecommunication Union, 1988, 1993, pp. 1 to 10.

"A Digital Modem Operating at Data Signalling Rates of Up to 6400 Bit/s for Use on a 4–Wire Circuit Switched Connection and on Leased Point–to Point 4–Wire Digital Circuits", Draft Recommendation V.91, Question: 23/16, v.91 Editor, International Telecommunication Union, Dec. 9, 1998, pp. 1 to 15.

Bellamy, John, *Digital Telephony, Second Edition*, Wiley Series in Telecommunications (1991), pp. 279–332.

"Data Communication Over the Telephone Network: Procedures for Starting Sessions of Data Transmission over the General Switched Telephone Network", Recommendation V.8, International Telecommunication Union, Sep. 1994, pp. 1 to 11.

* cited by examiner

*Primary Examiner*—Stephen Chin
*Assistant Examiner*—Lawrence Williams
(74) *Attorney, Agent, or Firm*—McDonnell Boehnen Hulbert & Berghoff

(57) ABSTRACT

Disclosed is an apparatus and method for low complexity, phase independent reception of FSK signals. A finite series of delay elements produces a plurality of equidistant samples of a received FSK signal. The plurality of equidistant samples is processed by an arithmetic unit using a phase independent algorithm to obtain an estimate of the received signal. The estimate of the received signal is then compared to a threshold value to determine if the estimate corresponds to a binary 1 or binary 0, which increments a counter corresponding to each binary value. Multiple estimates are counted over a baud interval of the received FSK signal and a binary 1 or binary 0 is output as a received data signal value depending upon which binary value the counter having the higher value corresponds to.

27 Claims, 7 Drawing Sheets

US 6,650,712 B1

LOW COMPLEXITY METHOD AND APPARATUS FOR FSK SIGNAL RECEPTION

FIELD OF INVENTION

The present invention relates to digital communications. More specifically, it relates to reception of a Frequency Shift Key (FSK) signal on a digital connection.

BACKGROUND OF THE INVENTION

Frequency Shift Keying (FSK) is a data modulation scheme commonly used in digital communications. FSK has been recommended as a low speed modulation format for numerous standards for the Public Switched Telephone Network (PSTN) by both national and international standards organizations. Examples of standards that recommend FSK are Bell 103, Bell 202, ITU-T V.21, ITU-T V.23, and ITU-T V.91.

FSK possesses several characteristics that make it useful for communication systems. It is a simple modulation method that is a commonly used approach to the exchange of additional low speed information in high speed communication systems. For instance, FSK is used when call waiting caller ID information is transmitted during a voice or data connection.

FSK is also used to exchange ITU-T V.8bis modem negotiation protocol messages as part of the V.91 negotiation procedure. V.91 defines a protocol between two modems that are connected through a 4-wire digital connection. The V.8 modem negotiation protocol is required for the identification and selection of common modes of operation over the 4-wire digital connection between the modems over the PSTN. Typically, reception of FSK signals is performed by digital processing algorithms. These algorithms may require extra processing power and may require the use of a digital signal processor (DSP).

In these applications, the computational complexity and memory requirements for demodulating of the FSK signal are very important. If an FSK reception algorithm requires additional hardware to perform the computation needed to decode the signal, then the algorithm is not suitable for low-cost devices that have limited computing resources.

It is well understood in the art that FSK can be detected using either a non-coherent method employing a frequency detector or a coherent method that utilizes a pair of product detectors.

FIG. 1 illustrates a generalized example of a coherent FSK receiver 10. The receiver 10 receives a received signal r(t) that is composed of a data signal s(t) and a noise signal n(t). The data signal s(t) is composed of mark (binary 1) and space (binary 0) signals $s_1(t)$ and $s_0(t)$, respectively. The mark signal $s_1(t)$ can be described as $s_1(t)=A \cos(\omega_1 t+\theta_c)$, where $\omega_1=2\pi f_1$ and $f_1$ is the frequency that represents a binary 1 in the FSK encoding scheme. The space signal $s_0(t)$ can be described as $s_0(t)=A \cos(\omega_0 t+\theta_c)$, where $\omega_0=2\pi f_0$ and $f_0$ is the frequency that represents a binary 0 in the FSK encoding scheme. In the FSK scheme described, $f_1 > f_0$ and the data frequency shift of s(t) is $\Delta F = f_1 - f_0$ around a center frequency $f_c$ of the FSK data signal s(t).

The receiver 10 includes an upper channel product detector 12 and a lower channel product detector 14, which each receive r(t). The upper channel product detector 12 receives a first coherent reference signal $2 \cos(\omega_1 t+\theta_c)$ at one input terminal and r(t) at a second input terminal. The lower channel product detector 14 receives a second coherent reference signal $2 \cos(\omega_0 t+\theta_c)$. Note here that, in coherent FSK detection, it is necessary to know the phase $\theta_c$ of the received sinusoidal signal in order to build the coherent reference signals $2 \cos(\omega_1 t+\theta_c)$ and $2 \cos(\omega_0 t+\theta_c)$.

The output of the lower channel product detector 14 is input to a negative terminal of summer 16 and the output of the upper channel product detector 12 is input to a positive terminal of summer 16. Summer 16 will subtract the lower channel output from the upper channel output in order to produce a difference signal at an output terminal of the summer. This difference signal is then input to a low pass filter (LPF) 18.

LPF 18, which can also be viewed as a matched filter, when combined with the frequency translation performed by product detectors 12 and 14, function as dual bandpass filters. Thus, the input noise n(t) that affects the output of receiver 10 consists of two narrowband components $n_1(t)$ and $n_0(t)$ centered at $f_1$ and $f_0$, respectively. The bandwidth B of LPF 18 is less than the frequency difference $\Delta F$, such that $2\Delta F > 2B$, where the effective bandwidth $B_p$ is 2B, and the filtering action of LPF 18 separates the mark and space signals $s_1(t)$ and $s_0(t)$ in order to produce a baseband analog output signal $r_o(t)$.

The baseband analog output signal $r_o(t)$ is $\{+A$ for a binary 1; $-A$ for a binary $0\} + n_o(t)$. This signal is input to sample and hold 20 that obtains a discrete signal $r_o(t_o)$ that is then input to threshold comparator 22 for comparison to threshold $V_T$. Because of the symmetry of the baseband analog output signal $r_o(t)$, i.e. a binary 1 is +A and a binary 0 is –A, and because the noise in each of the upper and lower channels is similar, i.e. white Gaussian noise, the optimum threshold for $V_T$ is 0. The threshold comparator 22 then outputs a digital output signal m(t) that reflects the data signal s(t) along with the noise signal n(t).

Note that the coherent FSK receiver requires that a coherent reference signal be obtained. The reference recovery circuitry required to recover the coherent reference is typically complex and expensive. Also, the coherent reference is often extracted from the noisy received FSK signal so that the reference itself contains noise. Also, the reference recovery circuitry required to recover the coherent reference is typically complex and expensive. As a consequence, a non-coherent receiver is often used to avoid the coherent reference recovery circuitry.

FIG. 2 illustrates a generalized noncoherent FSK receiver 30. Receiver 30 receives signal r(t) that is input to an upper channel detector 32 and a lower channel detector 42. The upper channel detector 32 is configured to detect the mark signal and is composed of a bandpass filter 34 centered on $f_1$ connected in series with an envelope detector 36. Envelope detector 36 outputs an upper channel output signal $v_U(t)$ that is input to a positive input terminal of summer 38.

The lower channel detector 42 is configured to detect the space signal and is composed of a bandpass filter 44 centered on $f_0$ connected in series with an envelope detector 46. Envelope detector 46 outputs a lower channel output signal $v_L(t)$ that is input to a negative input terminal of summer 38.

The analog output signal $r_o(t)$ from summer 38 is positive when the upper channel output signal $v_U(t)$ exceeds the lower channel output signal $v_L(t)$. A mark signal can be viewed as the signal value of $v_U(t)$ for a mark less the signal value of $v_L(t)$ for a mark or $\{+A+n_1(t)\}-\{0+n_0(t)\}$. Similarly, $r_o(t)$ from summer 38 is negative when the lower channel output signal $v_L(t)$ exceeds the upper channel output signal $v_U(t)$. Thus, a space signal can be viewed as the signal value of $v_L(t)$ for a space less the signal value of $v_U(t)$ for a space or $\{-A+n_0(t)\}-\{n_1(t)\}$. Noncoherent FSK detection requires only 1 dB of additional signal-to-noise ratio ($E_b/N_0$) over coherent FSK detection. However, in noncoherent FSK detection, it is unnecessary to generate a coherent reference signal and it is therefore unnecessary to know the phase $\theta_c$ of the received sinusoidal signal. An estimate of the phase information can be obtained using a phase locked loop (PLL) circuit. However, it is difficult to obtain a phase estimate in a digital receiver, particularly when the number of samples per binary bit is small because a phase estimate typically requires more than ten samples in order to converge. The Bell 202 and ITU-T V.23 standards, for example, set forth a requirement of only six samples per binary bit. Thus, noncoherent FSK receivers can be simpler to construct than coherent FSK receivers. However, in real systems, it is difficult to obtain relatively low bit error rate performance with noncoherent FSK detection.

FIG. 3 illustrates another generalized embodiment of a FSK demodulation receiver 60 that operates on a probabilistic method of demodulation. The probabilistic receiver 60 receives received data signal r(t) which is input to four different channels. The first channel is composed of product detector 62, integrator 64, sampling switch 66 and squaring operator 68 connected in series, where product detector 62 multiplies the received signal r(t) by $\cos 2\pi f_c t$. An output of squaring operator 68 is connected to a first input to adder 70. Likewise, the second channel is composed of product detector 72, integrator 74, sampling switch 76 and squaring operator 78 connected in series, where product detector 72 multiplies the received signal r(t) by $\sin 2\pi f_c t$. An output of squaring operator 78 is connected to a second input to adder 70.

The third channel is composed of product detector 82, integrator 84, sampling switch 86 and squaring operator 88 connected in series, where product detector 82 multiplies the received signal r(t) by $\cos 2\pi (f_c+\Delta f)t$. An output of squaring operator 88 is connected to a first input to adder 90. Likewise, the fourth channel is composed of product detector 92, integrator 94, sampling switch 96 and squaring operator 98 connected in series, where product detector 92 multiplies the received signal r(t) by $\sin 2\pi (f_c+\Delta f)t$. An output of squaring operator 98 is connected to a second input to adder 90.

Each of the sample switches 66, 76, 86 and 96 receives a sampling signal $f_s$ that periodically closes the switches in order to obtain an instantaneous sample of the detected signal in each channel. The sample signal $f_s$ has a sample time T that must be recovered from the received signal r(t) using clock recovery circuitry.

The value of $\Delta f=1/T$ of the sample time T such that the product detectors 82 and 92 for the third and fourth channels, respectively, detect a signal orthogonal to the signal detected by the product detectors 62 and 72, respectively, for the first and second channels. Note that the coefficients for product detectors 62, 72, 82 and 92 are all time varying and must therefore be constantly changed. The integrators 64, 74, 84 and 94 for each of the four channels of receiver 60 continuously integrate the detected signal of their respective product detectors from a beginning time instant for the signal detection of r(t) to a present time instant.

An output of adder 90 is subtracted from an output of adder 70 by subtractor 80 in order to obtain a decision value that is independent of the phase of the received signal. The receiver 60 selects the data signal, i.e. the mark frequency $f_1$ or the space frequency $f_0$, having the highest probability of having been sent by detecting the signal having the largest envelope value.

To obtain good performance from receiver 60, the sample rate $f_s$ must be devisable by both the mark frequency $f_1$ and the space frequency $f_0$. If this condition is not met, performance can degrade badly. However, the sample rate typically cannot be a multiple of both these frequencies. For example, ITU-T V.23 specifies a mark frequency of 1300 Hz and a space frequency of 2100 Hz while the sample rate is typically 7200 Hz, which is neither a multiple of 1300 Hz nor 2100 Hz.

Consequently, the need remains for a cost-effective FSK reception method.

SUMMARY OF THE INVENTION

In accordance with preferred embodiments of the present invention, some of the problems associated with conventional FSK receivers are overcome.

One aspect of the invention is a receiver for receiving a FSK signal having a first frequency corresponding to a binary "0" and a second frequency corresponding to a binary "1", where the receiver includes a finite series of delay elements, each element having an input and an output terminal and being configured to introduce a predetermined delay interval corresponding to a sampling period of the received signal, and where the input terminal of a first element of the finite series of delay elements is coupled to an input terminal of the receiver. An arithmetic unit of the receiver has a plurality of input terminals and an output terminal, where a first one of the plurality of input terminals is coupled to the input terminal of the first element of the finite series of delay elements and where each remaining one of the plurality of input terminals is coupled to the output terminal of a corresponding one of the delay elements, where the arithmetic unit is configured to generate a metric signal at the output terminal of the arithmetic unit using a phase independent equation. The receiver also has an integration and decision unit having an input terminal coupled to the output terminal of the arithmetic unit, where the integration and decision unit is configured to compare the metric signal to a threshold value to obtain a binary sample and integrate multiple binary samples in a baud interval of the FSK signal in order to generate a binary data signal at an output terminal of the integration and decision unit.

Another aspect of the present invention is a method for decoding a received signal having a first frequency representing a binary "0" and a second frequency representing a binary "1". The method according to the present invention includes sampling the received signal at a predetermined sample rate to obtain samples of the received signal and producing a series of equidistant samples by delaying the samples of the received signal. A phase independent trigonometric equation is used to generate an estimated value from the series of equidistant samples. Then, the estimated value is compared to a threshold value in order to generate a binary value corresponding to the estimated value. The method also calls for integrating each binary value generated in a baud interval in order to output a binary bit of a data signal.

The foregoing and other features and advantages of the present invention will be more readily apparent from the following detailed description, which proceeds with reference to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

The present invention is directed toward a simplified method and apparatus for receiving an FSK signal. FSK reception according to the present invention effectively detects a FSK modulated signal using one integer division operation per sample of the FSK signal. Thus, FSK reception according to the present invention is well suited to applications where a DSP or extra processing power are unavailable, such as for V.91 protocol implementation in low-cost terminal adapters.

Figure 1:
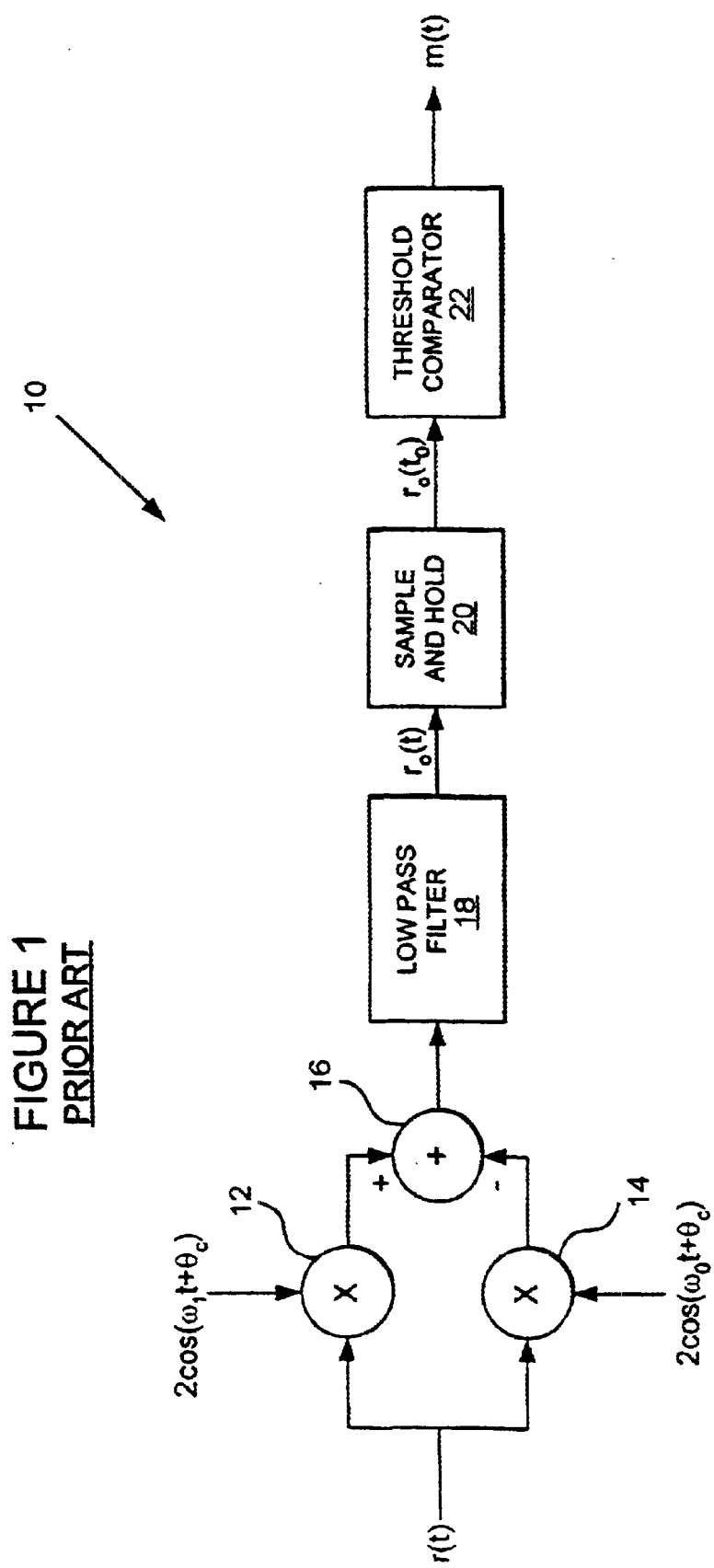
FIG. 1 is a block diagram illustrating a generalized coherent FSK receiver.
Figure 2:
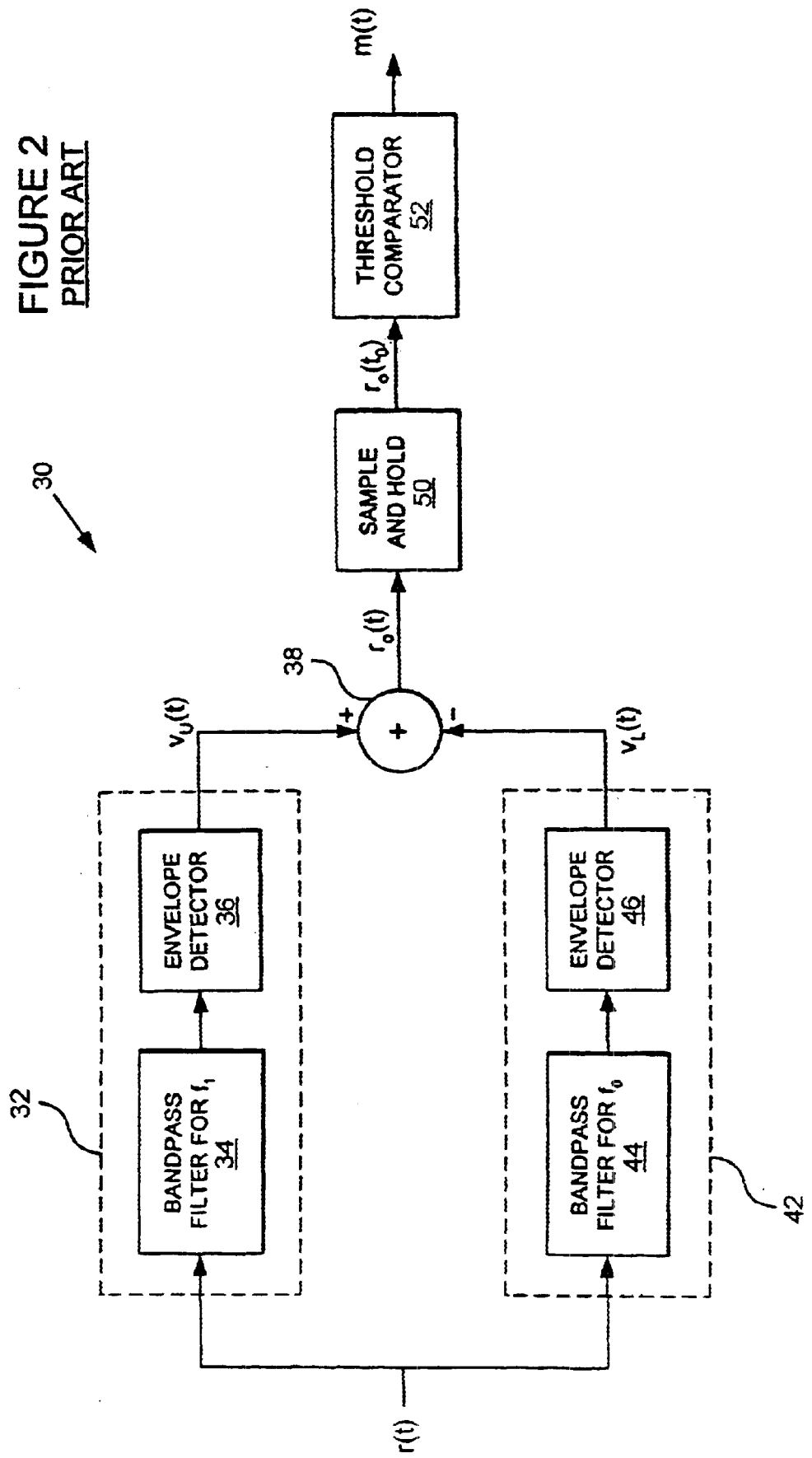
FIG. 2 is a block diagram illustrating a generalized noncoherent FSK receiver.
Figure 3:
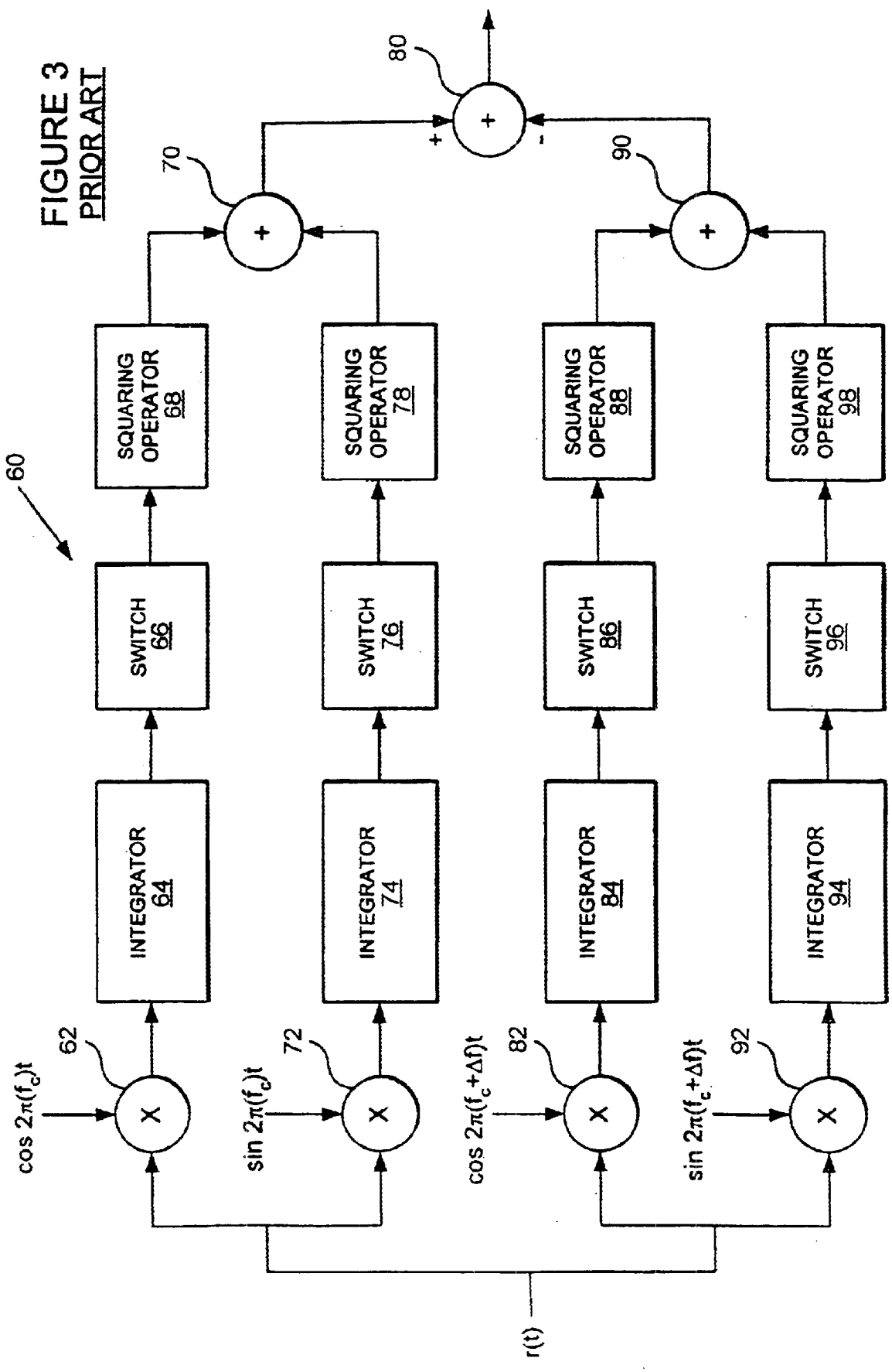
FIG. 3 is a block diagram of a generalized probabilistic noncoherent FSK receiver.
Figure 4:
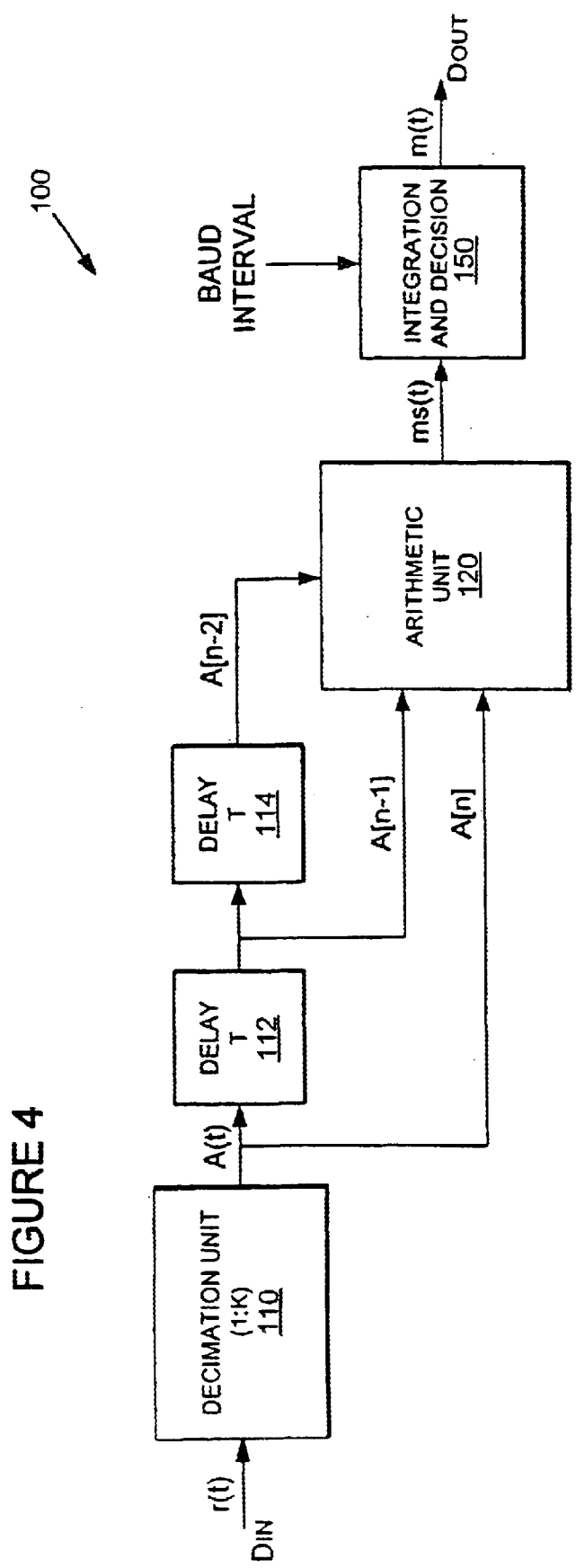
FIG. 4 is a block diagram of an embodiment of a receiver according to the present invention.

FIG. 4 illustrates an embodiment of a receiver 100 according to the present invention. Decimation unit 110 has an input that is coupled to input terminal DIN of receiver 100. An output terminal of decimation unit is input to a finite series of delay elements 112 and 114. The output of decimation unit 110, delay unit 112 and delay unit 114 is input to arithmetic unit 120. An output of arithmetic unit 120 is input to integration and decision unit 150 that is coupled to an output terminal DOUT of receiver 100. Each of the decimation unit 110, the finite series of delay units 112 and 114, and the integration and decision unit 150 are driven by a clock signal, which is not shown in the interest of clarity, that is the signal sample rate $f_s$ divided by constant K.

A received FSK signal r(t) present at input terminal DIN of receiver 100 is input to decimation unit 110. The received FSK signal r(t) is typically an 8000 Hz pulse code modulated (PCM) signal. Decimation unit 110 divides the incoming signal r(t) by a constant K in order to generate a divided signal A(t). The value for constant K can be determined for each sampling rate and is typically in the range of 2 to 3. Selection of the value of K is discussed in greater detail below.

The divided signal A(t) generated by decimation unit 110 is input to the finite series of delay elements 112 and 114, where each delay element delays the divided signal by one sample period T of the sample rate after decimation by decimation unit 110. As a result, three samples A[n], A[n−1] and A[n−2] of the divided signal are presented to arithmetic unit 120, where each of the three samples is separated by T in time.

The arithmetic unit 120 then generates a value of a metric signal ms(t) according to equation (1) below:

$$\cos(2\pi f_i T) = (A[n] + A[n-2]) / (2 \cdot A[n-1]) \quad (1)$$

where i=0 or 1 and $f_i$ is the characteristic frequency of a binary 0 or binary 1, respectively. Equation (1) will hold true for any sampling interval T regardless of the initial phase of the sine wave of the received signal r(t). In equation (1), the result of the right hand side of the equation is compared to the expected result of the left hand side in order to determine whether the received signal is $f_0$ or $f_1$.

The metric signal ms(t) generated by arithmetic unit 120 is then input to integration and decision unit 150. Integration and decision unit 150 slices and integrates the values of ms(t) over an entire baud interval in order to produce either a binary 0 or a binary 1 in the digital output signal m(t) that is output to output terminal DOUT of receiver 100. Each baud interval is indicated by a BAUD INTERVAL signal input to the integration and decision unit 150. An approximation of a slicing threshold for integration and detection unit 150 coupled to arithmetic unit 120 operating according to equation (1) is:

$$\text{THRESHOLD} = [\cos(2\pi f_0 T) + \cos(2\pi f_1 T)]/2 \quad (1a)$$

Decimation unit 110 introduces an additional degree of freedom in optimizing the performance of receiver 100 in terms of computational complexity and bit error rate. In a sense, decimation unit 110 permits the sampling rate to be chosen arbitrarily rather than being fixed at 8000 Hz. Since computational complexity in the receiver is directly proportional to the sampling rate, it is advantageous to reduce the number of samples processed.

In order to minimize the bit error rate, it is necessary to maximize the Euclidean distance between symbols. Given the system parameters $f_0$ and $f_1$ with respect to $f_s$, the Euclidean distance $E_d$ can be represented by $$E_d = ABS[\cos(2\pi f_0 K / f_s) - \cos(2\pi f_1 K / f_s)]$$

Therefore, values of K exist that tend to maximize the Euclidean distance $E_d$. K is selected to be an integer value in order to reduce the computational complexity. Given $f_s$=8000 Hz, $f_0$=1300 Hz and $f_1$=2100 Hz, as defined in ITU-T V.23, the data in table 1 below can be obtained.

TABLE 1

| K | $\cos(2\pi f_0 \cdot K/f_s)$ | $\cos(2\pi f_1 \cdot K/f_s)$ | $E_d$ |
| --- | --- | --- | --- |
| 1 | 0.522 | −0.078 | 0.600 |
| 2 | −0.454 | −0.987 | 0.533 |
| 3 | −0.997 | 0.233 | 1.230 |
| 4 | −0.588 | 0.951 | 1.539 |
| 5 | 0.383 | −0.383 | 0.766 |
| 6 | 0.988 | −0.891 | 1.879 |

As can be seen in table 1, a value of 6 for K offers the largest value of $E_d$. However, when K=6, then a larger amount of data is required in order to integrate a result in integration and decision unit 150. The amount of available data is limited by another system parameter, the system baud rate $f_b$. Unfortunately, as K becomes larger, less data will available for integration due to the limits presented by the baud rate. This, in turn, will also affect the bit error rate. Therefore, the value of K must be selected as a compromise between the performance offered by greater Euclidian distance, the complexity and data demands introduced by a higher value of K, and the limits of the system baud rate.

To minimize the complexity of the decimation unit, only integer values of K are considered. Further, it is desirable to obtain at least three samples, using equation (1) above or equation (2) below, for each baud interval in order to obtain a reliable decision. Consequently, n=5 consecutive samples per baud interval are required, since each calculation using equations (1) and (2) requires three data samples. Therefore, the value of K should be $K < f_s / (n \cdot f_b)$.

Using the values for V.23, i.e. $f_s$=8,000 Hz and $f_b$=600 baud, then K=8000/(5*600)=2.666. Therefore, K is selected to be less than 3. The final choice for the value of K, either K=1 or K=2 in the present example, is selected to minimize bit error rate. For the V.23 example, K=1 obtains a better bit error rate, but K=2 is less computationally expensive. System simulations may show that K=2 also yields an acceptable bit error rate performance with lower complexity. Simulation of each system using the parameters characteristic to that system will ultimately direct the designer's choice of K in combination with the present discussion.

An important characteristic of equation (1) above performed by arithmetic unit 120 is that it holds true for any three equidistant samples of a monotone signal regardless of the sampling phase and the distance between closest samples. The main requirement is that the samples be equidistant, which is satisfied by using a fixed sampling rate. Equation (1) possesses an additional advantage in that it holds true regardless of the tone amplitude.

Figure 5:
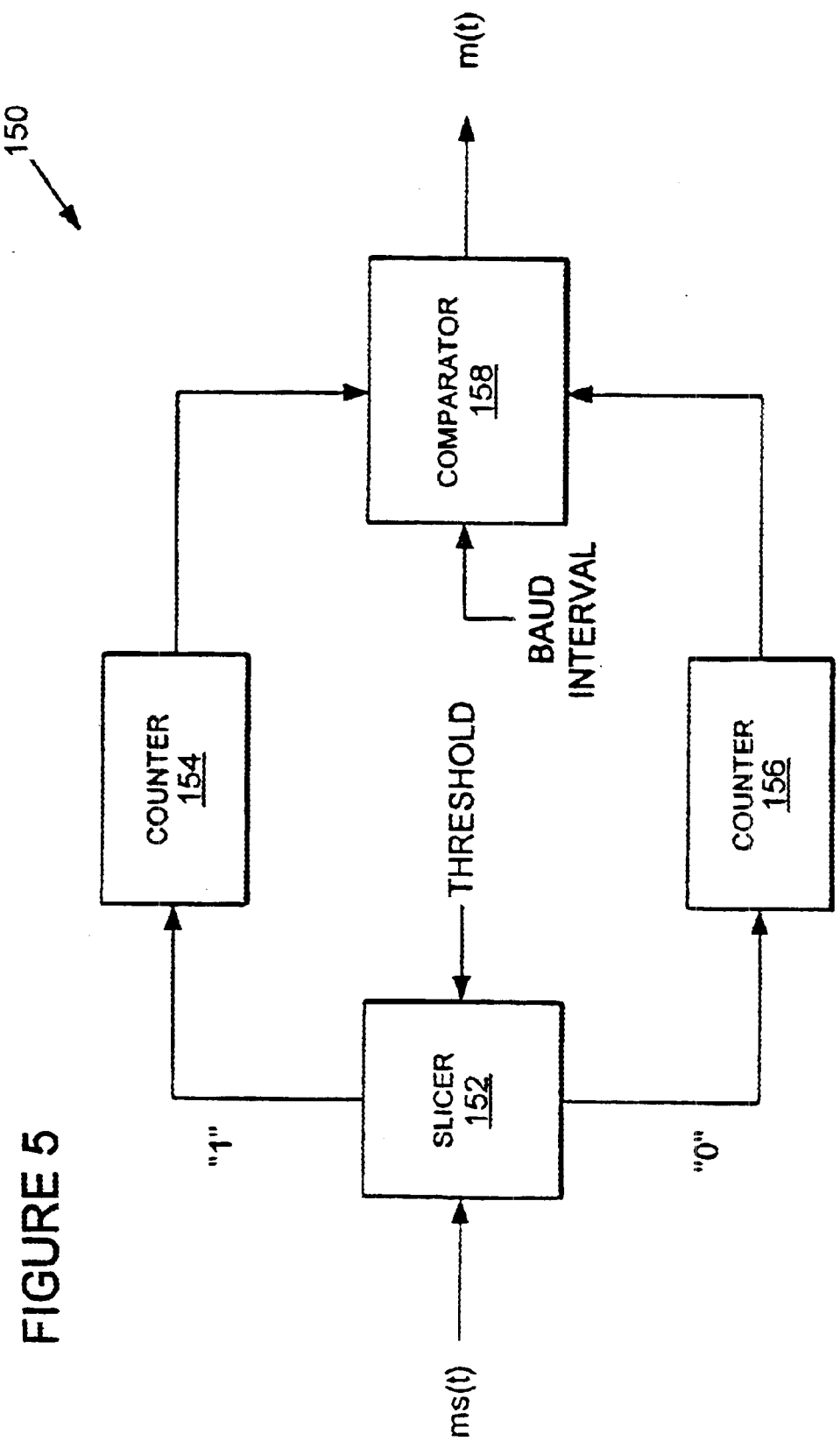
FIG. 5 is a block diagram of an embodiment of the integration and decision unit of FIG. 4.

FIG. 5 is a block diagram illustrating an embodiment of integration and decision unit 150 of FIG. 4. The value of calculated metric ms(t), which is $\cos(2\pi f_i T)$ from equation (1) in this embodiment, that is output by arithmetic unit 120 is input to slicer 152 that also receives a THRESHOLD value determined using equation (1a) above. If the value of $\cos(2\pi f_i T) \geq$ THRESHOLD, then slicer 152 outputs a "1" signal that increments counter 154. If the value of $\cos(2\pi f_i T) <$ THRESHOLD, then slicer 152 outputs a "0" signal that increments counter 156.

When the BAUD INTERVAL signal indicates the end of a baud interval, comparator 158 compares the value of counter 154 to the value of counter 156 in order to determine the value output as m(t). If the value of counter 154 is greater than or equal to the value of counter 156, then a binary 1 value is output as m(t). Else, the value of counter 156 is greater than the value of counter 154 and comparator 158 generates a binary 0 as m(t). Counters 154 and 156 are then reset in order to sample the next baud interval.

Figure 6:
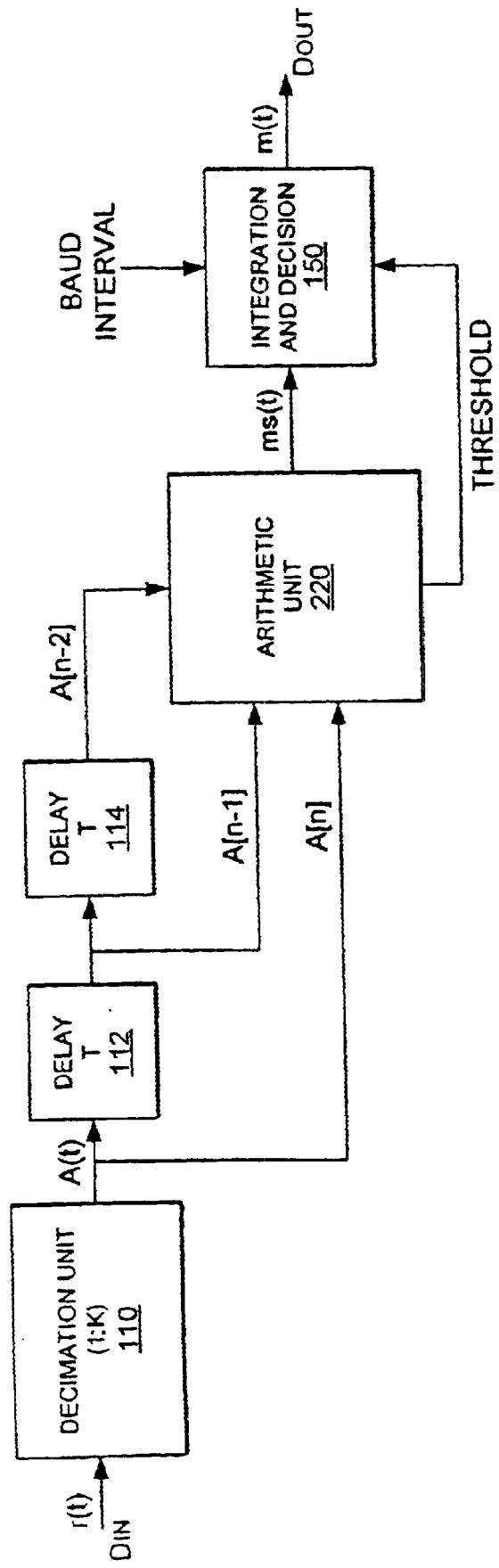
FIG. 6 is a block diagram of another embodiment of a receiver according to the present invention.

Another embodiment of a receiver 200 according to the present invention is shown in FIG. 6 and includes arithmetic unit 220. Arithmetic unit 220 generates ms(t) using equation (2) below, which is less computationally complex than equation (1) above, and generates the value of THRESHOLD used by integration and decision unit 150. Equation (2) is:

$$A^2/2 * [\cos(4\pi f_i T) - 1] = A[n]* A[n-2] - A[n-1]^2 \quad (2)$$

where A is the magnitude of the sine wave of the received signal r(t). Like equation (1) above, equation (2) holds true for any three equidistant samples of a monotone signal regardless of the sampling phase and the distance between closest samples. However, it does require estimation of the tone power, i.e. the $A^2/2$ term on the left side of the equation. Since samples must be squared to obtain the $A[n-1]^2$ term on the right hand side of the equation, the power estimate does not substantially increase the computational complexity of equation (2).

Integration and decision unit 150 slices the value of ms(t) output from arithmetic unit 220 using the value of THRESHOLD generated by arithmetic unit 220 and integrates it over an entire baud interval to produce a binary 0 or binary 1 in the digital output signal m(t). The slicing THRESHOLD of integration and decision unit 150 is generated by arithmetic unit 220 using equation (2a) below:

$$\text{THRESHOLD} = A^2 [\cos(4\pi f_0 T) + \cos(4\pi f_1 T)]/4 \quad (2a)$$

Unlike equation (1a), the slicing threshold according to equation (2a) depends upon the square of the power of the sine wave $A^2$. However, as can be seen in equation (2), the arithmetic unit 220 already computes the value of $A^2$, which is used to calculate the value for the THRESHOLD signal output from arithmetic unit 220 to integration and decision unit 150.

Arithmetic unit 220 can calculate the value of $A^2$ by, for example, maintaining a running average according to equation (2b) below.

$$\text{Power}[n] = (1-\beta)\text{Power}[n-1] + \beta A[n-1]^2 \quad (2b)$$

and an estimate for A2 is obtained from:

$$A^2 = 2\text{Power}[n] \quad (2c)$$

Equation (2b) is effectively a low pass filter, where $\beta$ determines the bandwidth of the filter. When $\beta$ is approximately 1, the bandwidth is narrow. When $\beta$ is approximately 0, the bandwidth is wide.

Note that the calculations for equations (2b) and (2c) do not add significantly to the overall computational complexity of receiver 200 because the term $A[n-1]^2$ is already calculated in equation (2) and is therefore available for use in equations (2b) and (2c) without the need for further computation.

Figure 7:
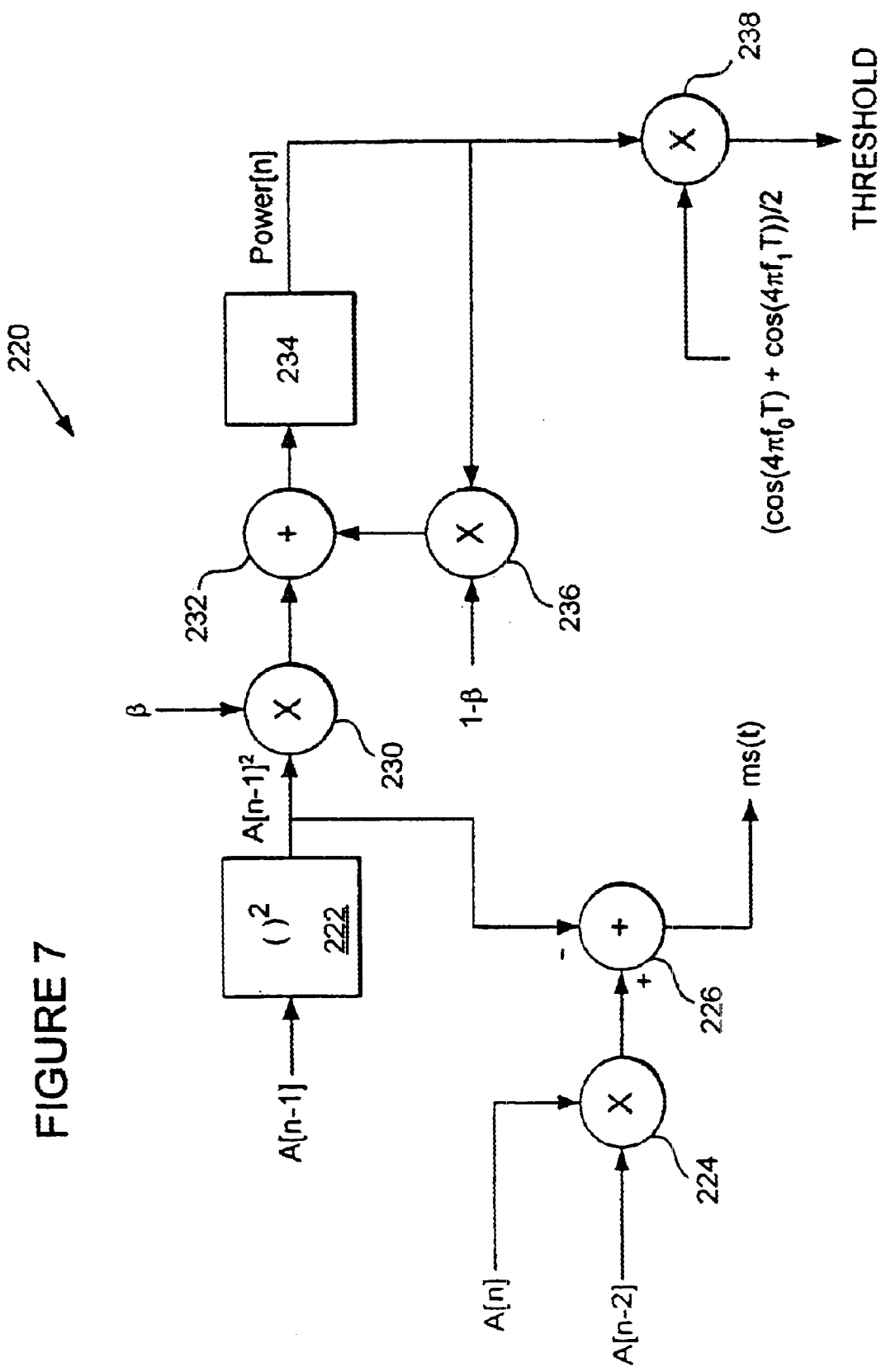
FIG. 7 is a block diagram of an embodiment of the arithmetic unit of FIG. 6.

FIG. 7 is a block diagram of an embodiment of the arithmetic unit 220 of FIG. 6.

Sample $A[n-1]$ output by delay element 112 is input to squaring operator 222 that squares the input value and outputs it to multiplier 230 and subtractor 226. Samples $A[n]$ and $A[n-2]$ received from the output of decimation unit 110 and delay element 114, respectively, are input to a multiplier 224. The output of squaring operator 222, $A[n-1]^2$, is subtracted from the output of multiplier 224 by subtractor 226 in order to produce the output signal ms(t) of arithmetic unit 220.

The output of squaring operator 222, $A[n-1]^2$, is multiplied by $\beta$ by multiplier 230. The output of multiplier 230 is input to adder 232, which adds the output of multiplier 236 and the output of multiplier 230 in order to produce a power estimate value that is output to delay element 234. The delayed power estimate Power[n] is output to multiplier 238 for use in calculating the value of THRESHOLD and also to multiplier 236. Multiplier 236 multiplies the delayed power estimate by $(1-\beta)$ and outputs the result to adder 232 for use in calculating the next power estimate value.

The multiplier 238 multiplies the delayed power estimate Power[n] by the value of $(\cos(4\pi f_0 T) + \cos(4\pi f_1 T))/2$ in order to produce a value for THRESHOLD. THRESHOLD is output by arithmetic unit 220 to integration and decision unit 150 which uses the value of THRESHOLD to determine the binary value represented by ms(t).

It should be understood that the programs, processes, methods, systems and apparatus described herein are not related or limited to any particular type of computer apparatus (hardware or software). Various types of general purpose or specialized computer apparatus may be used with or perform operations in accordance with the teachings described herein. For instance, one of ordinary skill in the art will appreciate that the function of the arithmetic units 120 and 220 can be implemented in dedicated hardware using hardware arithmetic units, such as adders, subtractors and multipliers, or in machine readable code executing on a digital signal processor (DSP) or other type of computer processor. Similarly, the function of integration and detection unit 150 can be implemented in hardware logic circuitry or in machine readable code executing on a DSP or other processing unit.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, one of ordinary skill in the art will readily recognize that the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A receiver for receiving a FSK signal having a first frequency corresponding to a binary "0" and a second frequency corresponding to a binary "1", the receiver comprising:

a finite series of delay elements, each element having an input and an output terminal and being configured to introduce a predetermined delay interval corresponding to a sampling period of the received signal, and where the input terminal of a first element of the finite series of delay elements is coupled to an input terminal of the receiver;

an arithmetic unit having a plurality of input terminals and an output terminal, where a first one of the plurality of input terminals is coupled to the input terminal of the first element of the finite series of delay elements and where each remaining one of the plurality of input terminals is coupled to the output terminal of a corresponding one of the delay elements, where the arithmetic unit is configured to generate a metric signal at the output terminal of the arithmetic unit using a phase independent equation; and an integration and decision unit having an input terminal coupled to the output terminal of the arithmetic unit, where the integration and decision unit is configured to compare the metric signal to a threshold value to obtain a binary sample and integrate multiple binary samples in a baud interval of the FSK signal in order to generate a binary data signal at an output terminal of the integration and decision unit.

2. The receiver of claim 1, where the arithmetic unit is configured to generate values of the metric signal using the equation $\cos(2\pi f_i T)=(A[n]+A[n-2])/(2*A[n-1])$, where i=0 or 1 and $f_i$ is the characteristic frequency of a binary 0 or binary 1, respectively, T represents the sample period for a sample rate at which the FSK signal is sampled, $A[n]$ represents the FSK signal value at the input terminal of the first one of the finite series of delay elements, $A[n-1]$ represents the divided signal value at the output terminal of the first one of the finite series of delay elements, and $A[n-2]$ represents the divided signal value at the output terminal of a second one of the finite series of delay elements.

3. The receiver of claim 2, where the threshold value of the integration and decision unit is determined by the equation $[\cos(2\pi f_0 T)+\cos(2\pi f_1 T)]/2$.

4. The receiver of claim 3, further including a decimation unit interposed the input terminal of the receiver and the input terminal of the first one of the finite series of delay elements, where the decimation unit is configured to divide the FSK signal by a predetermined constant K in order to generate a divided signal for input to the finite series of delay elements.

5. The receiver of claim 4, where the predetermined constant K is an integer selected such that $K<f_s/(n*f_b)$, where $f_s$ is a sample rate corresponding to the sample period of the received signal, n is selected to provide at ]cast three samples of the received signal for each baud interval, and $f_b$ is a baud frequency corresponding to the baud interval of the received signal.

6. The receiver of claim 1, where the arithmetic unit is configured to generate values of the metric signal using the equation $A^2/2*[\cos(4\pi f_i T)-1]=A[i]*A[n-2]-A[n-1]^2$, where A is a magnitude of the sine wave of the received signal, where i=0 or 1 and $f_i$ is the characteristic frequency of a binary 0 or binary 1, respectively, T represents the sample period of the sample rate for a sample rate at which the FSK signal is sampled, $A[n]$ represents the divided signal value at the input terminal of the first one of the finite series of delay elements, $A[n-1]$ represents the divided signal value at the output terminal of the first one of the finite series of delay elements, and $A[n-2]$ represents the divided signal value at the output terminal of a second one of the series of delay elements.

7. The receiver of claim 6, wherein the arithmetic unit is further configured to generate the threshold value using the equation $A^2[\cos(4\pi f_0 T)+\cos(4\pi f_1 T)]/4$.

8. The receiver of claim 7, further including a decimation unit interposed the input terminal of the receiver and the input terminal of the first one of the finite series of delay elements, where the decimation unit is configured to divide the FSK signal by a predetermined constant K in order to generate a divided signal for input to the finite series of delay elements.

9. The receiver of claim 8, where the predetermined constant K is an integer selected such that $K<f_s/(n*f_b)$, where $f_s$ is a sample rate corresponding to the sample period of the received signal, n is selected to provide at least three samples of the received signal for each baud interval, and $f_b$ is a baud frequency corresponding to the baud interval of the received signal.

10. A method for decoding a received signal having a first frequency representing a binary "0" and a second frequency representing a binary "1", the method comprising the steps of:

sampling the received signal at a predetermined sample rate to obtain samples of the received signal;

producing a series of equidistant samples by delaying the samples of the received signal;

series using a phase independent trigonometric equation to generate an estimated value from the series of equidistant samples;

comparing the estimated value to a threshold value in order to generate a binary value corresponding to the estimated value; and integrating each binary value generated in a baud interval in order to output a binary bit of a data signal.

11. The method of claim 10, where the phase independent trigonometric equation comprises $\cos(2\pi f_i T)=(A[n]+A[n-2])/(2*A[n-1])$, where i=0 or 1 and $f_i$ is the characteristic frequency of a binary 0 or binary 1, respectively, T represents the sample period for a sample rate at which the received signal is sampled, $A[n]$ represents a first equidistant sample of the received signal, $A[n-1]$ represents a second equidistant sample of the received signal, and $A[n-2]$ represents a third equidistant sample of the received signal.

12. The method of claim 11, where the threshold value is determined by the equation $[\cos(2\pi f_0 T)+\cos(2\pi f_1 T)]/2$.

13. The method of claim 12, where the step of sampling the received signal at a predetermined sample rate to obtain samples of the received signal includes decimating the received signal using a predetermined constant K in order to reduce the number of samples.

14. The method of claim 13, where the predetermined constant K is an integer selected such that $K<f_s/(n*f_b)$, where $f_b$ is the predetermined sample rate of the received signal, n is selected to provide at least three samples of the received signal for each baud interval, and $f_b$ is a baud frequency corresponding to the baud interval of the received signal.

15. The method of claim 10, where the phase independent trigonometric equation comprises $A^2/2*[\cos(4\pi f_i T)-1]=A[n]*A[n-2]-A[n-1]^2$, where A is a magnitude of the sine wave of the received signal, where i=0 or 1 and $f_i$ is the characteristic frequency of a binary 0 or binary 1, respectively, T represents the sample period of the sample rate for a sample rate at which the received signal is sampled, A[n] represents a first equidistant sample of the received signal, A[n−1] represents a second equidistant sample of the received signal, and A[n−2] represents a third equidistant sample of the received signal.

16. The method of claim 15, where the threshold value is determined by the equation $A^2[\cos(4\pi f_0 T)+\cos(4\pi f_1 T)]/4$.

17. The method of claim 16, where the step of sampling the received signal at a predetermined sample rate to obtain samples of the received signal includes decimating the received signal using a predetermined constant K in order to reduce the number of samples.

18. The method of claim 17, where the predetermined constant K is an integer selected such that $K<f_s/(n*f_b)$, where $f_s$ is the predetermined sample rate of the received signal, n is selected to provide at least three samples of the received signal for each baud interval, and $f_b$ is a baud frequency corresponding to the baud interval of the received signal.

19. A receiver for decoding a received signal having a first frequency representing a binary "0" and a second frequency representing a binary "1", the receiver comprising:

receiving means for sampling the received signal at a predetermined sample rate to obtain samples of the received signal;

delaying means for producing a series of equidistant samples by delaying the samples of the received signal;

estimating means for generating an estimated value from the series of equidistant samples using a phase independent trigonometric equation;

comparing means for comparing the estimated value to a threshold value in order to generate a binary value corresponding to the estimated value; and integrating means for integrating each binary value generated in a baud interval in order to output a binary bit of a data signal.

20. The receiver of claim 19, where the phase independent trigonometric equation further comprises $\cos(2\pi f_i T)=(A[n]+A[n-2])/(2*A[n-1])$, where i=0 or 1 and $f_i$ is the characteristic frequency of a binary 0 or binary 1, respectively, T represents the sample period for a sample rate at which the received signal is sampled, A[n] represents a first equidistant sample of the received signal value, A[n−1] represents a second equidistant sample of the received signal, and A[n−2] represents a third equidistant sample of the received signal.

21. The receiver of claim 20, where the threshold value of the comparing means is determined by the equation $[\cos(2\pi f_0 T)+\cos(2\pi f_1 T)]/2$.

22. The receiver of claim 21, where the receiving means includes decimating means for decimating the received signal using a predetermined constant K in order to reduce the number of samples.

23. The receiver of claim 22, where the predetermined constant K is an integer selected such that $K<f_s/(n*f_b)$, where $f_s$ is the predetermined sample rate of the received signal, n is selected to provide at least three samples of the received signal for each baud interval, and $f_b$ is a baud frequency corresponding to the baud interval of the received signal.

24. The receiver of claim 19, where the phase independent trigonometric equation further comprises $A^2/2*[\cos(4\pi f_i T)-1]=A[n]*A[n-2]-A[n-1]^2$, where A is a magnitude of the sine wave of the received signal, where i=0 or 1 and $f_i$ is the characteristic frequency of a binary 0 or binary 1, respectively, T represents the sample period of the sample rate for a sample rate at which the received signal is sampled, A[n] represents a first equidistant sample of the received signal, A[n−1] represents a second equidistant sample of the received signal, and A[n−2] represents a third equidistant sample of the received signal.

25. The receiver of claim 24, where the threshold value of the comparing means is determined by the equation $A^2[\cos(4\pi f_0 T)+\cos(4\pi f_1 T)]/4$.

26. The receiver of claim 25, where the receiving means includes decimating means for decimating the received signal using a predetermined constant K in order to reduce the number of samples.

27. The receiver of claim 26, where the predetermined constant K is an integer selected such that $K<f_s/(n*f_b)$, where $f_s$ is the predetermined sample rate of the received signal, n is selected to provide at least three samples of the received signal for each baud interval, and $f_b$ is a baud frequency corresponding to the baud interval of the received signal.

* * * * *